UNITED STATES PATENT OFFICE.

WILHELM HERZBERG, OF BERLIN, GERMANY, ASSIGNOR TO ACTIEN GESELLSCHAFT FÜR ANILIN FABRIKATION, OF BERLIN, GERMANY.

YELLOW-RED AZO DYE.

No. 800,914.   Specification of Letters Patent.   Patented Oct. 3, 1905.

Application filed July 7, 1905. Serial No. 268,723.

*To all whom it may concern:*

Be it known that I, WILHELM HERZBERG, of Berlin, in the Kingdom of Prussia, German Empire, have invented new and useful Improvements in the Production of New Azo Dyes; and I do hereby declare that the following is a full, clear, and exact description thereof, which will enable others skilled in the art to which it appertains to make and use the same.

This invention relates to the production of a new group of mono-azo coloring-matters which, as I have discovered, in the form of their lakes are distinguished by their brilliant blue-red or yellow-red shade and by a great fastness against the action of light, which lakes are insoluble in water and oil.

These new azo dyes derive at one side from an ortho-amido-sulfonic acid of the benzene or naphthalene series the diazo compounds of which are combined in the usual manner with the 2.7-dioxynaphthalene, whereafter the azo dyes obtained are treated, for instance, with benzene-sulfo chlorid $C_6H_5.SO_2.Cl$ or para-toluene-sulfo chlorid $CH_3C_6H_4.SO_2.Cl$ in the presence of an alkaline agent. Thus the general formula of this new group of dyestuffs is the following:

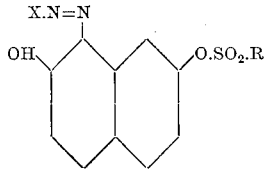

X meaning the rest of an ortho-amido sulfonic acid of the benzene or naphthalene series—as, for instance, the rest of the para-nitranilin-ortho-sulfonic acid, meta-chloro-anilin-ortho-sulfonic acid, paratoluidin-ortho-sulfonic acid, para-phenetidin-ortho-sulfonic acid, 2.1-naphthylamin-ortho-sulfonic acid, &c., and R meaning the rest $C_6H_5$ or $C_6H_4.CH_3$ or the rest of another suitable sulfonic acid, the chlorid of which is to act on the one OH group of the 2.7-dioxynaphthalene, thus yielding the corresponding esters.

The following examples will serve to illustrate my invention, the parts of which are by weight:

First. Two hundred and twenty parts of para-nitranilin-ortho-sulfonic acid are diazotized in the usual manner by means of seventy parts of sodium nitrite and the respective quantity of hydrochloric acid. The diazo solution is allowed to run into a solution of one hundred and sixty parts of 2.7-dioxynaphthalene in water added with two molecules of sodium hydroxid and to which solution has been added such a quantity of sodium carbonate that the combination will occur in an alkaline solution. The reaction takes place while stirring for some hours, whereafter the mass is warmed to 60° to 80°. The dyestuff precipitates for a great part with a brilliant yellow-red color. By adding some common salt and allowing to cool the separation is completed. After filtering the residue is suspended with some water added with the corresponding quantity of soda-lye (one molecular proportion of NaOH for one molecule of the dyestuff) and then thoroughly stirred with one molecule of para-toluene-sulfo chlorid $CH_3.C_6H_4.SO_2.Cl$ for about four hours. Hereby the mass is transformed in a crystalline and very brilliant yellow-red powder of the dyestuff:

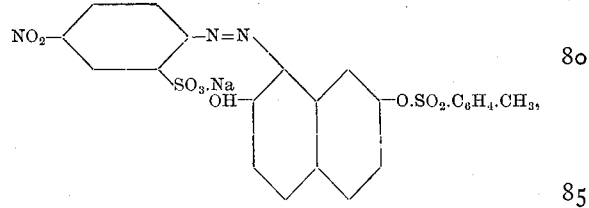

which is very difficultly soluble in water. It is filtered, washed, and dried. The barium-aluminium lake of this dyestuff is a very brilliant yellow-red powder insoluble in water and oil and very fast against the action of light. Upon strong reduction with tin and hydrochloric acid the dyestuff yields paraphenylendiamin-ortho-sulfonic acid and 2.7-dioxy-1-amidonaphthalene besides para-toluene sulfonic acid.

Second. Diazotize two hundred and seventeen parts of para-phenetidin-ortho-sulfonic acid in the usual manner by means of seventy parts of sodium nitrite and the necessary quantity of hydrochloric acid. Introduce the diazo solution while stirring well in a solution of one hundred and sixty parts of 2.7-dioxynaphthalene which has been added with two molecules of sodium hydroxid and such a quantity of sodium carbonate as to maintain the whole alkaline. The combination will be finished after some hours. Then heat the mass to 60° to 80° for some time and allow afterward to cool. Now prepare the solution so as to have on one molecule of the dyestuff one molecule of sodium hydroxid and while stirring very thoroughly introduce one molecular proportion of para-toluene-sulfo chlorid. After four to six hours the reaction is complete and all the dyestuff of the formula

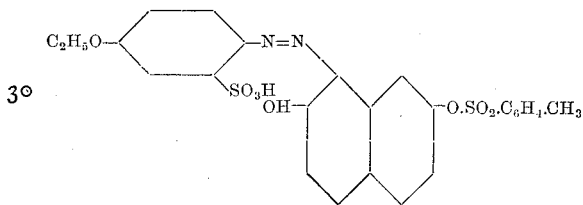

has separated out it is filtered, washed, and dried. It forms a crystalline powder having a very brilliant blue-red color. The barium-aluminium lake possesses also a very brilliant blue-red color. It is insoluble in water and oil and very fast against the action of light. Upon strong reduction with tin and hydrochloric acid the dyestuff yields para-phenetidin-sulfonic acid and 2.7-dioxy-1-amido-naphthalene besides para-toluene-sulfonic acid.

It is obvious that I am not limited to the above examples nor to the details given therein. So instead of para-toluene-sulfo chlorid mentioned in the above examples I may use benzene-sulfo chlorid $C_6H_5.SO_2.Cl$ or a chlorid of another suitable sulfonic acid. Furthermore, other ortho-amido-sulfonic acids than the two employed in the above examples may be used—for instance, meta-chloro-anilin sulfonic acid or 2.1-naphthylamin-sulfonic acid.

Having now described my invention and in what manner the same is to be performed, what I claim is—

1. As a new article of manufacture the monoazo dyestuffs of the general formula:

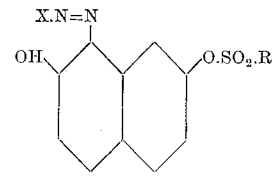

as defined in the foregoing specification, these dyestuffs being in the dry state blue-red to yellow-red crystalline powders, very difficultly soluble in water, dyeing on wool from an acid-bath yellow-red to blue-red shades, and the lakes of which are insoluble in water and oil, being very brilliant powders of a blue-red to yellow-red color and very fast against the action of light, these dyestuffs yielding upon strong reduction with tin and hydrochloric acid the underlying ortho-amido-sulfonic acid and 2.7-dioxy-1-amido-naphthalene besides para-toluene-sulfonic acid.

2. As a new article of manufacture the monoazo dyestuff of the formula:

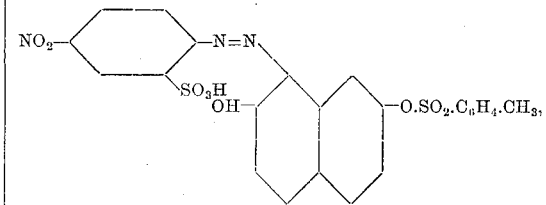

being in the form of a sodium salt in the dry state a crystalline powder of a yellow-red brilliant color, almost insoluble in water, and the barium-aluminium lake of which is a very brilliant powder of a yellow-red shade, totally insoluble in water and oil, very fast against the action of light, this dyestuff yielding upon strong reduction with tin and hydrochloric acid para-phenylenediamin-sulfonic acid and 2.7-dioxy-1-amidonaphthalene besides para-toluene-sulfonic acid.

In witness whereof I have hereunto signed my name, this 23d day of June, 1905, in the presence of two subscribing witnesses.

WILHELM HERZBERG.

Witnesses:
 HENRY HASPER,
 WOLDEMAR HAUPT.